(12) United States Patent
Lee

(10) Patent No.: US 9,414,433 B2
(45) Date of Patent: *Aug. 9, 2016

(54) SYSTEM AND METHOD FOR REMOTELY OPERATING A WIRELESS DEVICE USING A SERVER AND CLIENT ARCHITECTURE

(71) Applicant: Cassis International PTE LTD, Singapore (SG)

(72) Inventor: Kwang Wee Lee, Singapore (SG)

(73) Assignee: Cassis International Lte Ltd, Singapor (SG)

( * ) Notice: Subject to any disclaimer, the term of this patent is extended or adjusted under 35 U.S.C. 154(b) by 11 days.

This patent is subject to a terminal disclaimer.

(21) Appl. No.: 14/246,167

(22) Filed: Apr. 7, 2014

(65) Prior Publication Data

US 2014/0223033 A1 Aug. 7, 2014

Related U.S. Application Data

(63) Continuation of application No. 13/788,027, filed on Mar. 7, 2013, now Pat. No. 8,694,695, which is a continuation of application No. 13/722,577, filed on Dec. 20, 2012, now abandoned, which is a continuation of application No. 12/660,723, filed on Mar. 3, 2010, now Pat. No. 8,341,087, which is a continuation-in-part of application No. 12/386,208, filed on Apr. 14, 2009, now Pat. No. 8,442,509, and a continuation-in-part of application No. 12/386,210, filed on Apr. 14, 2009, now abandoned, and a continuation-in-part of application No. 12/386,211, filed on Apr. 14, 2009, now Pat. No. 8,477,082, and a continuation-in-part of application No. 12/386,212, filed on Apr. 14, 2009, now Pat. No. 8,396,992, and a continuation-in-part of application No. 12/386,213, filed on Apr. 14, 2009, now Pat. No. 8,254,903.

(60) Provisional application No. 61/206,454, filed on Jan. 30, 2009, provisional application No. 61/206,453, filed on Jan. 30, 2009, provisional application No. 61/206,427, filed on Jan. 30, 2009, provisional application No. 61/206,797, filed on Feb. 4, 2009.

(51) Int. Cl.
*H04W 80/06* (2009.01)
*H04L 29/06* (2006.01)
*G06F 12/14* (2006.01)

(52) U.S. Cl.
CPC ............... *H04W 80/06* (2013.01); *G06F 12/14* (2013.01); *H04L 29/06047* (2013.01); *H04L 67/42* (2013.01)

(58) Field of Classification Search
CPC . H04W 80/06; H04L 67/42; H04L 29/06047; G06F 12/14
USPC ........... 455/418–420, 41.2, 552.1, 556.1–558
See application file for complete search history.

(56) References Cited

U.S. PATENT DOCUMENTS

| | | | |
|---|---|---|---|
| 8,254,903 B2 * | 8/2012 | Lee ......................... | G06F 9/445 455/41.2 |
| 8,694,695 B2 * | 4/2014 | Lee ......................... | H04L 67/42 710/13 |
| 8,738,815 B2 * | 5/2014 | Lee ......................... | G06F 9/445 455/73 |

*Primary Examiner* — Sharad Rampuria
(74) *Attorney, Agent, or Firm* — Jeffrey L. Snow; Pryor Cashman LLP

(57) ABSTRACT

The present disclosure relates to a system and method for remotely operating one or more peripheral devices of a wireless device using a server and client architecture. In one aspect, the system may comprise a wireless device that includes a processor, a memory, a peripheral device, and a server adapted to communicate with the peripheral device; and a removable media device that includes a memory, a processor, and a client adapted to communicate with the server of the wireless device. In another aspect, the method may comprise the steps of emulating a hardware interface on a removable media device; mapping a peripheral device of a wireless device to the interface; mapping a processor of the media device to the peripheral device; wrapping and sending hardware commands from a client of the media device to a server of the wireless device; and executing the commands on the peripheral device.

19 Claims, 10 Drawing Sheets

SYSTEM AND METHOD FOR REMOTELY OPERATING A WIRELESS DEVICE USING A SERVER AND CLIENT ARCHITECTURE

CROSS-REFERENCE TO RELATED APPLICATIONS

This Application is a continuation of U.S. Non-Provisional patent application Ser. No. 13/788,027, filed Mar. 7, 2013, which will issue as U.S. Pat. No. 8,694,695 on Apr. 8, 2014, the disclosure and teachings of which are incorporated herein by reference. That Application claims priority to U.S. Non-Provisional patent application Ser. No. 13/722,577, filed Dec. 20, 2012, which itself claims priority to U.S. Non-Provisional application Ser. No. 12/660,723, filed Mar. 3, 2010, which issued on Dec. 25, 2012, as U.S. Pat. No. 8,341,087, both of which are also incorporated herein by reference. Application Ser. No. 12/660,723 claims priority to U.S. Non-Provisional patent application Ser. No. 12/386,208 (which issued as U.S. Pat. No. 8,442,509 on May 14, 2013), Ser. Nos. 12/386,210, 12/386,211 (which issued as U.S. Pat. No. 8,477,082 on Jul. 2, 2013), Ser. No. 12/386,212 (which issued as U.S. Pat. No. 8,396,992 on Mar. 12, 2013), and Ser. No. 12/386,213 (which issued as U.S. Pat. No. 8,254,903 on Aug. 28, 2012), all filed Apr. 14, 2009, the disclosures of which are all incorporated herein by reference, and all of which claim priority to U.S. Provisional Patent Application Ser. Nos. 61/206,454, 61/206,453, and 61/206,427, filed Jan. 30, 2009, and Ser. No. 61/206,797, filed Feb. 4, 2009, the disclosures and teachings of which are all incorporated herein by reference as well.

FIELD OF THE INVENTION

The present invention relates to a system and method for operating the hardware of a wireless device from a remote media device using a server and client architecture.

BACKGROUND OF THE INVENTION

In the present PC environment, viruses, spyware and malware may be present in PCs, which may compromise valuable data or transactions. Universal Serial Bus ("USB") devices like secure token may perform cryptography, secure key generation and storage. However, secure tokens still require the application to be run on the PC with the plan information and data to access this feature and this leave the plain information and data before encryption vulnerable to attack. IBM's® USB secure stick, the Zone Trusted Information Channel, has an on-board processor used to create a secure socket layer ("SSL") channel, but not for running a secure application. The application is still using the host PC memory and leaves a memory trace on the host PC that is vulnerable to a virus or spyware attack.

Penprotect™ software for a host PC uses encryption to protect files within a USB flash drive, flash memory, or USB stick. But Penprotect software does not protect the encrypted files once they are decrypted and running on the host PC. Furthermore, the same encrypted files stored in the USB memory stick require Penprotect software to be installed on another PC before they can be accessed, so the encrypted files are not portable.

Livetoken™ is a USB drive with a Linux Operating System ("OS") and a secure chip installed on it to store the keys and passwords. However, Livetoken's design requires the host PC to be rebooted to run the OS on the USB drive. Furthermore, the Linux OS is very dependent on the host PC hardware configuration, and will not work on any other host PC.

U3™ technology from Sandisk allows a portable application in a USB flash drive to be used only on a Windows XP® or Windows Vista® PC. This provides only application portability, but not security for the application and data execution on the host PC because U3 technology uses the host PC memory to execute the portable application. This leaves the U3 technology open for attack from a virus or spyware.

Current wireless device designs have all the software layers running on the handset main processor with the telephony hardware, radio hardware, Bluetooth, Audio Codec, Wireless Fidelity ("WiFi"), General Packet Radio Service ("GPRS"), display screen, camera hardware, and associated software applications. The application and the runtime environment are dependent on the particular handset hardware architecture. Accordingly, all applications and run-time environments of the device are likely not portable or compatible among devices with different hardware architectures.

SUMMARY OF THE INVENTION

This disclosure describes a secure processor stick ("SPS") for use with a computer. The SPS may provide a secure processing environment in any computer environment, including but not limited to an unsecured environment like a virus infected system or a cyber cafe. The secure application to be run securely is executed in the SPS's processor and memory; it does not make use of the host PC memory and does not leave any memory traces in the host PC.

Embodiments of the present invention include a system and method where the application software, runtime environment, telephony frameworks (including those for making calls and short messages), and embedded operating system of a wireless device may be controlled remotely from the device hardware via a high speed interface (including but not limited to USB or MMIC) from a removable media device which may be a system-on-chip in any form factor, including but not limited to an MultiMedia Card ("MMC"), Secure Digital ("SD"), micro Secure Digital ("micro SD"), Subscriber Identity Module ("SIM"), Security Authentication Module ("SAM"), or USB dongle form factor.

In one embodiment, the system may comprise a wireless device that includes a processor, a memory, a peripheral device, and a server adapted to communicate with the peripheral device; and a removable media device that includes a memory, a processor, and a client adapted to communicate with the server of the wireless device. In another embodiment of the present invention, the method may comprise emulating a hardware interface on a removable media device; mapping a peripheral device of a wireless device to the interface; mapping a processor of the media device to the peripheral device; wrapping and sending hardware commands from a client of the media device to a server of the wireless device; and executing the commands on the peripheral device.

BRIEF DESCRIPTION OF THE DRAWINGS

Features and other aspects of embodiments of the present invention are explained in the following description taking in conjunction with the accompanying drawings, wherein.

DETAILED DESCRIPTION

Various embodiments of the present invention will now be described in greater detail with reference to the drawings.

Figure 1:
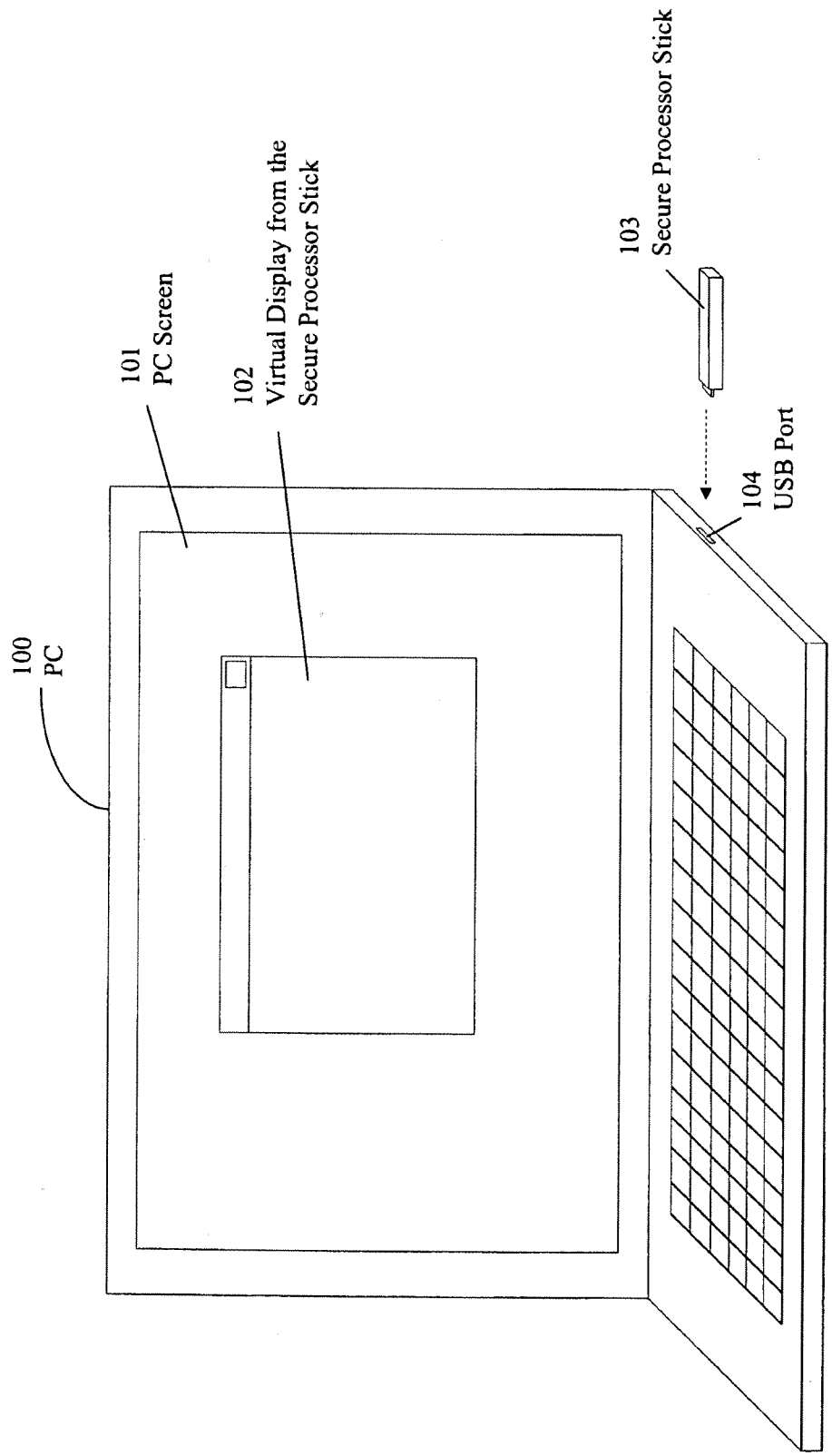
FIG. 1 illustrates a schematic diagram showing the interface between the 8 SPS and the host PC according to an embodiment of the invention.

As shown in FIG. 1, an example of a secure processor stick 103 may interface with a PC 100 via a USB port 104. As used herein, the PC may be a laptop, palmtop, netbook, notebook, desktop, or any other general-purpose computer having a port capable of interfacing with an Standby Power supply ("SPS"). Once connected, the secure processor stick 103 may display a virtual display 102 on the PC screen 101. The connection to the host PC 100 may be made by USB 104, firewire, or any network connection to the host PC 100.

SPS network connectivity may be provided by the host PC 100 through a Transmission Control Protocol/Internet Protocol ("TCP/IP") bridge on the USB port 104 where the SPS 103 accesses the network using Virtual Private Network ("VPN"), Secure Sockets Layer ("SSL") or encryption. The UI/Display for the SPS OS and application may be displayed as a window on the host PC screen 101 in a window 102. The screen/UI may be transferred from a virtual screen bitmap in the SPS 103 to the host PC 100 window via USB 104.

The process/application running on the SPS 103 may not leave raw data on the host PC 100, and there may not be a memory trace on the host PC 100 from the application/process running. A firewall on the SPS 103 may restrict the access only to a VPN or secure host. A host PC 100 may have no access to the SPS files or data. The data and files on the SPS 103 may be secure and may be encrypted using a smart chip for added security. The SPS 103 may be the size of a USB flash drive and can be easily kept by the owner at all times for portability and security. Linux version 2.6.28.2 may be used as the OS for the SPS 103, and an ARM 9 processor may be used as the SPS processor. An NXP LPC3131 development board may be used for the components in the SPS 103. The USB port 104 may be used as the interface between the ARM 9 processor and the host PC 100 as shown in FIG. 1.

The USB on the SPS 103 may be a composite USB device with both a CD-ROM component, which may install the PC application, and a CDC Ethernet class component, which may facilitate communication between the ARM 9 processor and the virtual display, input devices, and networking of the host PC 100.

Figure 2:
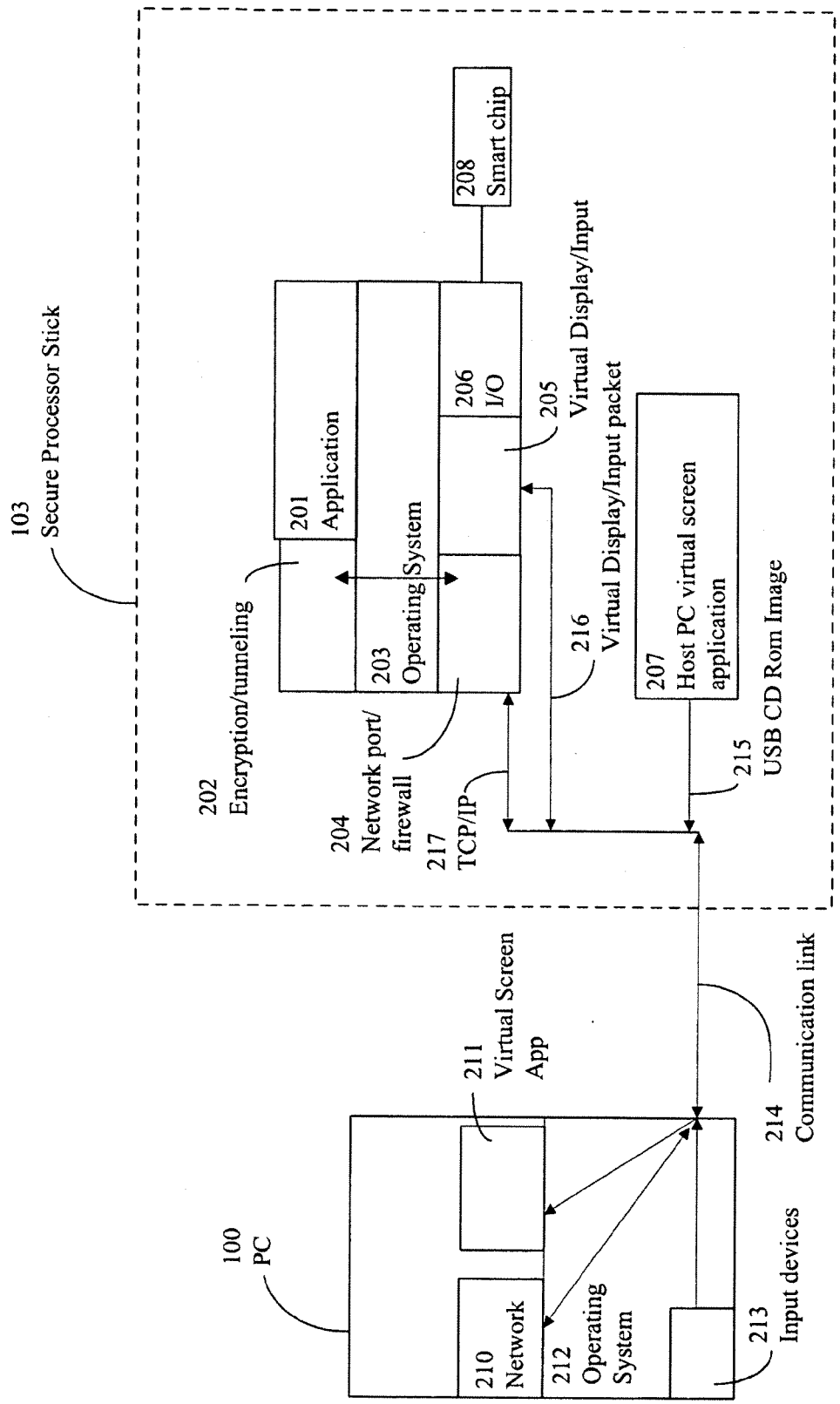
FIG. 2 illustrates a block diagram showing the software stack for the SPS 10 according to an embodiment of the invention.

FIG. 2 illustrates the software stack for the SPS 103. The SPS 103 may contain only the processor, a memory, and a smart chip 208. The smart chip 208 may be used to store the key and the data encryption algorithm. Within the SPS 103, an SPS application 201 and encryption and tunneling software 202 may interface with a network port 204, a virtual display and virtual input 205, and input/output 206 via an operating system 203. The smart chip 208 may interface directly with the input/output 206 to ensure encrypted data transmission. A composite USB device 214 may connect the SPS 103 with the PC 100. The network port 204 may contain a firewall. The network port 204 may communicate with the PC 100 via the composite USB device 214 via TCP/IP 217. The virtual display and virtual input 205 may communicate with the PC 100 via the composite USB device 214 via a virtual display and virtual input packet 216, respectively. The host PC virtual screen application 207 may communicate with the PC 100 via the composite USB device 214 via a USB CD-ROM image 215. On the PC 100, the PC operating system 212 may direct the PC input devices 213 to transmit data via the composite USB device 214 to the virtual input 205 on the SPS 103. In another aspect, the PC operating system 212 may direct the PC network software and/or hardware 210 to transmit and receive data via the composite USB device 214 to and from the TCP/IP 217 on the SPS 103. In another aspect, the PC operating system 212 may direct the virtual screen application 211 to receive data via the composite USB device 214 from the host PC virtual screen application 217 on the SPS 103.

User Interface (UI) and Display

Figure 3:
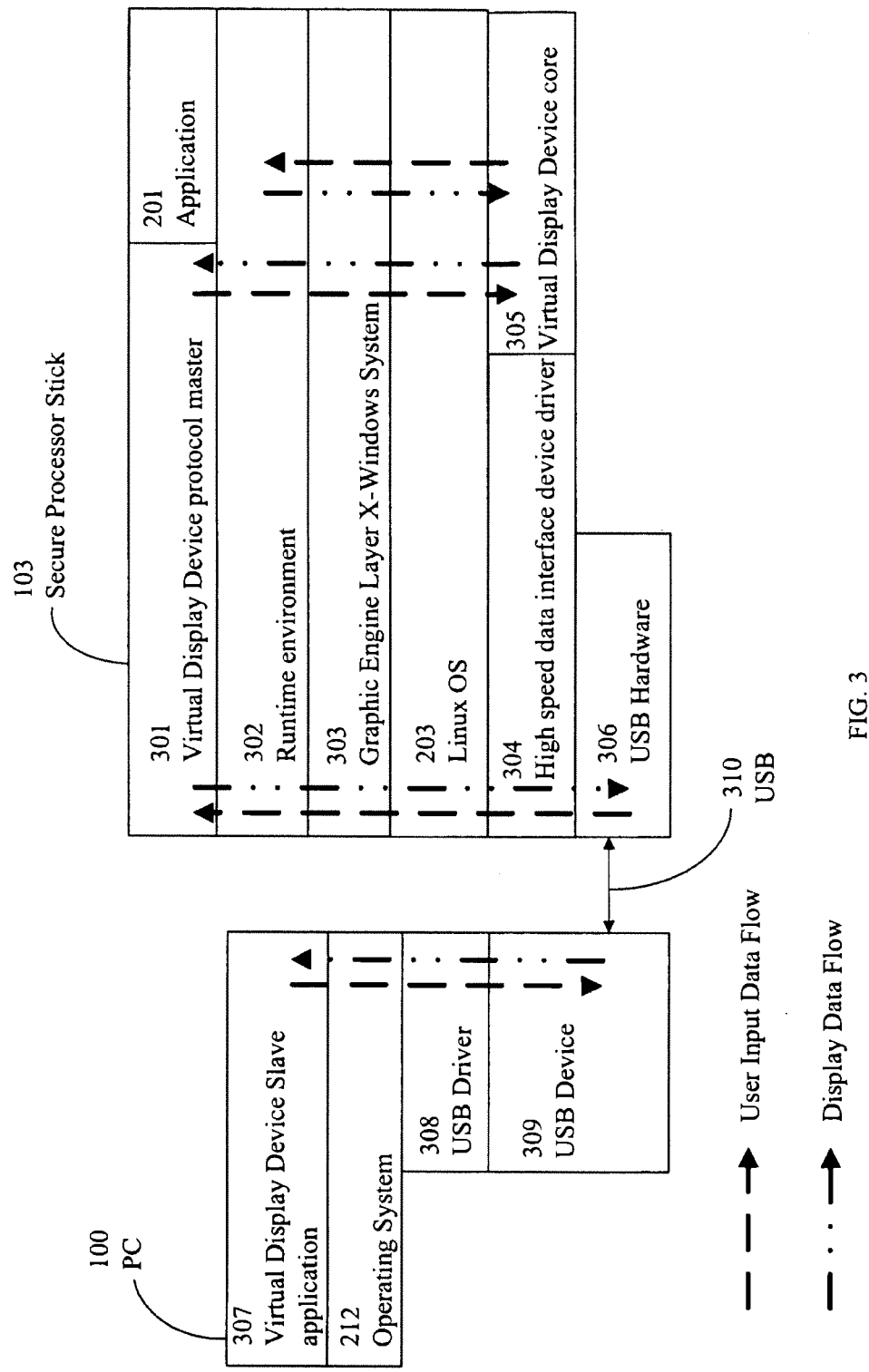
FIG. 3 illustrates a block diagram showing the software stack for transferring the virtual screen on the secure process stick to the host PC according to an embodiment of the invention.

The SPS 103 may not contain a display, so there may be a need to display the UI for the OS 203 and the application 201 running on it. This may be accomplished by opening a window 102 in the host PC 100 to display the display buffer of the SPS screen. This process is covered and explained by patent U.S. patent application Ser. No. 12/386,211 for "System and Method for Implementing a Remote Display Using a Virtualization Technique," which is incorporated fully by reference herein. FIG. 3 illustrates one embodiment of the software stack for transferring the virtual screen on the secure process stick 103 to the PC 100 using an application. In this way, only display pixels may be transferred from the SPS 103 to the host PC's Virtual Display Device slave application 211 without necessarily communicating other information or data to the host PC 100.

FIG. 3 illustrates a prototype setup of the virtual display on the SPS 103 interfacing with a PC 100. The software on the SPS 103 may exist in layers, with a Virtual Display Device protocol master 301 and an application 201 interfacing through a runtime environment 302 a graphic engine layer 303, and an operating system 203 with a high speed data interface device driver 304 and a virtual display device core 305. The high speed data interface device driver 304 may communicate with the PC 100 using the USB hardware 306 via the USB connection 310. The PC 100 may have a virtual display device ("VDD") slave application 307 that runs on an operating system 212. The operating system 212 may interface with a USB driver 308 have a USB device 309 that communicates with the SPS 103. In one embodiment, the virtual display device slave application 307 may receive display information from the virtual display device protocol master 301 via the USB connection 310.

User Interface (UI) and Keyboards, Mice, and Other Inputs

When the mouse is clicked on the virtual display from the SPS window 102, the mouse and keyboard input may be automatically transferred to the OS 203 running on the SPS 103. The mouse cursor movement may be locked within the window of the virtual screen 102. The cursor and keyboards may be released back to other host PC programs or the host PC OS 212 by hitting the Escape key. This process is covered and explained by patent U.S. patent application Ser. No. 12/386,210 for "System and Method for Implementing a Remote Input Device Using Virtualization Techniques for a Wireless Device," which is incorporated fully by reference herein.

Network Access

The SPS 103 may establish network access with a network bridge between the host PC network 210 to the outside world through a USB Communications Device Class ("CDC")/Ethernet port. There may be a firewall on the front end of the SPS network port 204 to block direct access of the file system or data on the SPS OS 203. To enhance security, the SPS 103 may only access the outside world via a VPN or other encrypted server. In this way, the host PC 100 may not have access to any unencrypted data from the SPS 103 passing through its network port.

The Smart Chip Device on the SPS

The primary use of the smart chip 208 may be to store keys or password used by the SPS 103. The smart chip 208 may also contain the encryption and decryption algorithm used for the data/file system and network access.

Usage Model of the SPS with a PC

The host PC 100 may run an operating system 212 such as Windows XP, Windows Vista, or a Mac OS, but is not limited to these operating systems. In one aspect of the present invention, the SPS 103 may be in a USB form factor. In another aspect, this USB SPS 103 may be connected to any USB port 104 on a host PC that may even be booted up. The SPS 103 may be a composite USB device containing a CDC/Ethernet class component and a CD-ROM component. The application stored in the CD-ROM component 207 may auto-run when the SPS 103 is connected to the host PC 100. This application 207 may open up a window 102 on the host PC screen 101 and set up the network bridge 217 between the host PC 100 and the SPS 103. The SPS OS 203, may show the boot up screen for the SPS 103 in the window 102 on the host PC screen 101.

Matchbox may be used as the desktop GUI 302 on the SPS 103. Password challenges may function as a process for login to gain access to the SPS 103. The host PC mouse cursor and keyboard input 213 may be transferred to the SPS OS 203 to navigate and launch a program in the SPS file system. A network connection to the outside world may be established either via VPN or an encrypted link to a secure server. A web browser or application may use the secure network to communicate with the outside world. The host PC 100 may see the SPS 103 as a network device, but the SPS device 103 will be blocked by a firewall on the SPS network connection 204. No files or data may be transferred between the SPS 103 and the host PC 100 with a firewall enabled on the SPS network connection 204.

Other Usage of the SPS

The SPS 103 may enable TV, digital photo frame, or other display device 401 functionality with web connectivity or a network application like email, messaging applications, and even games with or without the smart chip 208. In one embodiment, the SPS 103 may communicate with a display device 401 via a USB hub 407 on the display device 401. This may be accomplished by implementing the VDD Slave for the SPS display 404 and displaying it on the display screen 402. Input from the user may be accomplished by receiving IR remote instructions via a remote sensor 406, where a VID protocol slave application 405 sends the instructions of the IR remote to the SPS OS 203.

Figure 4:
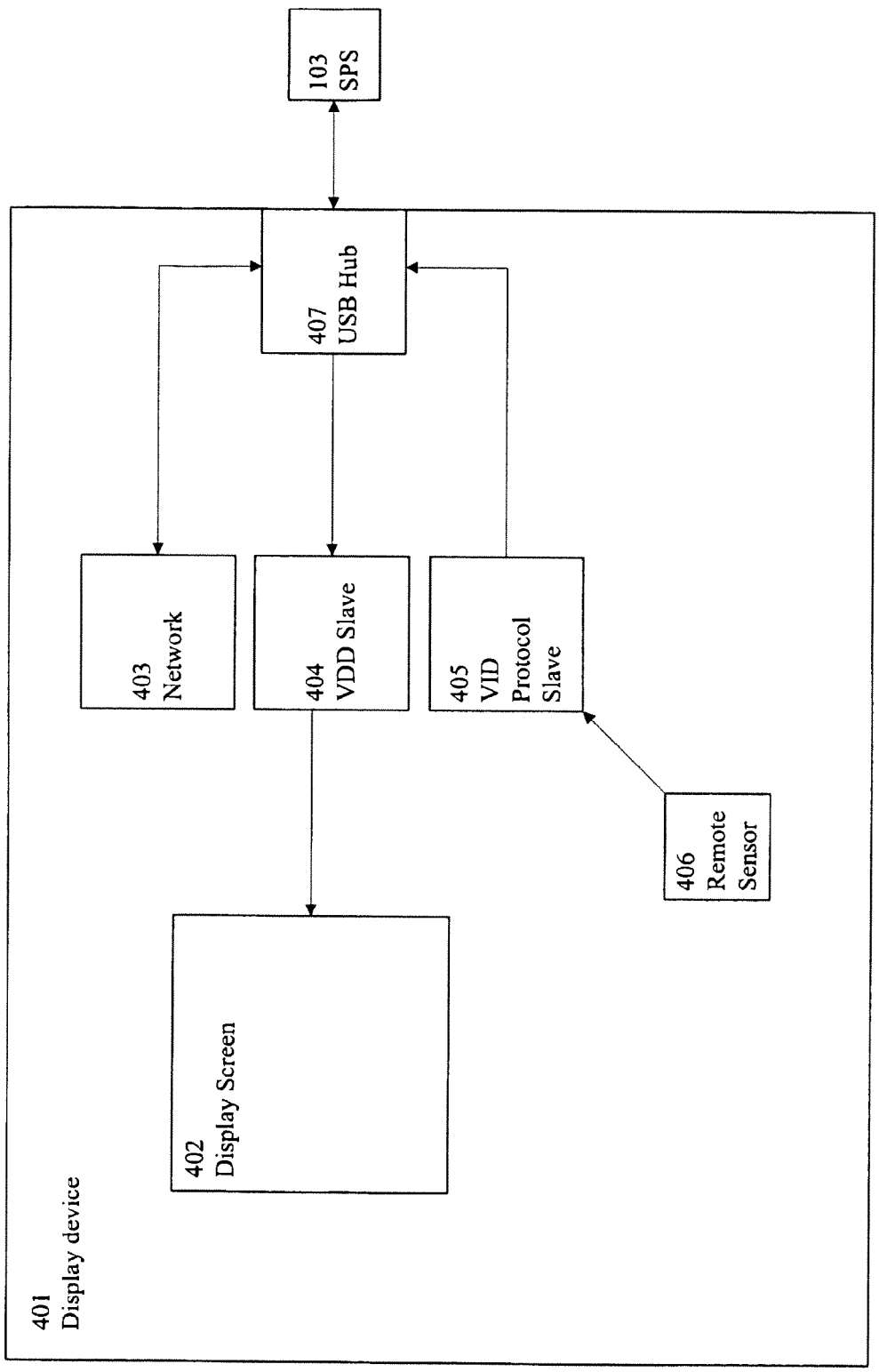
FIG. 4 illustrates a block diagram showing the block diagram for web connectivity or network applications according to an embodiment of the invention.

Network connectivity may be achieved using a wireless, Ethernet, or USB device connection 403, but is not limited to these. A USB network device may only require a standard driver to be installed in the SPS OS 203. FIG. 4 illustrates the block diagram for web connectivity or network applications.

Figure 5:
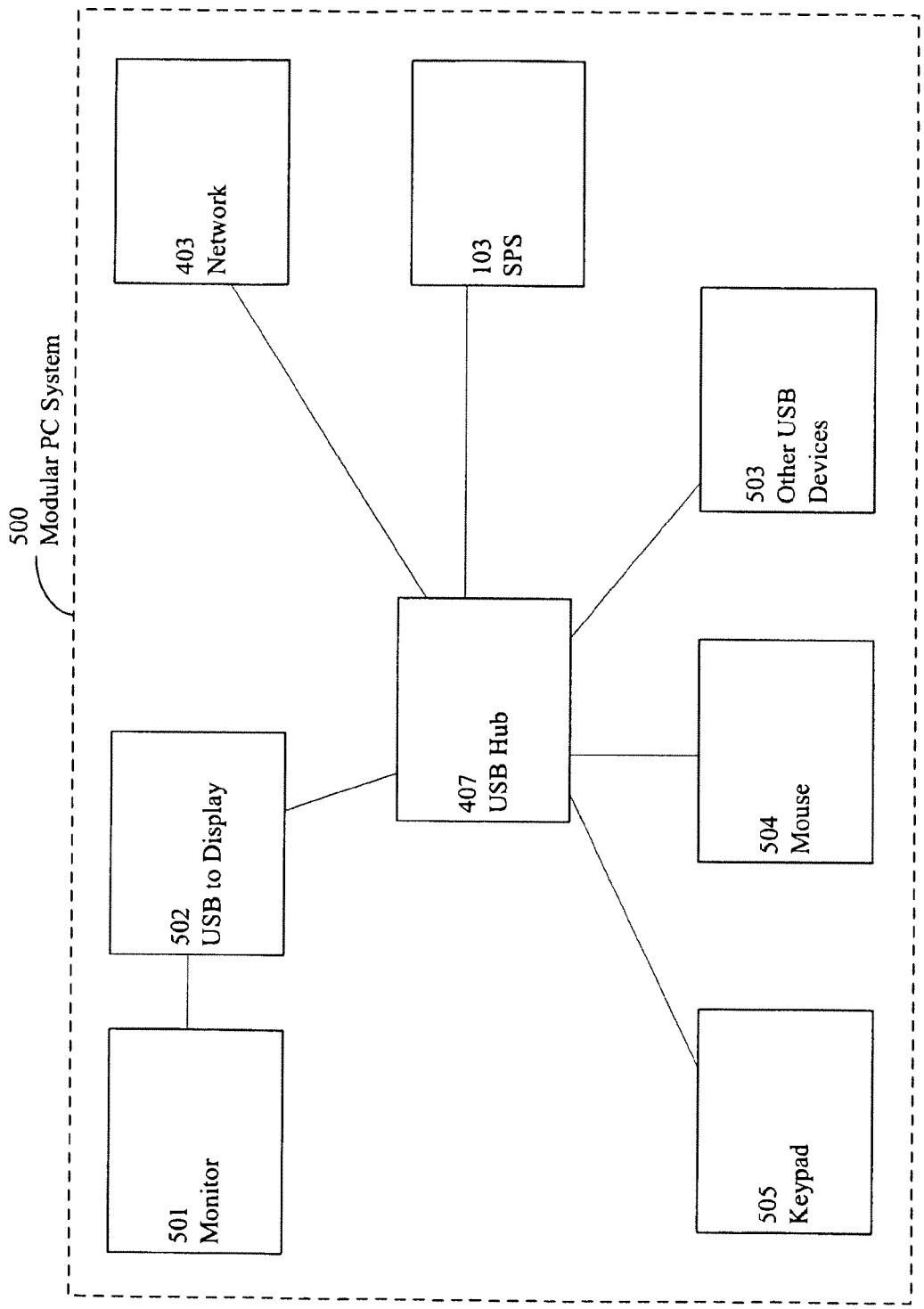
FIG. 5 illustrates a block diagram showing how a modular PC system using standard USB devices can be built according to an embodiment of the invention.

Another application of the SPS 103 may be to build a modular PC 500 using standard USB devices. FIG. 5 illustrates how a modular PC system 500 using standard USB devices can be built. A Linux OS may be installed, requiring standard Linux drivers for the USB devices to make them work together as a modular PC 500. In this aspect, the SPS 103 may be the USB host device. In one embodiment, the SPS 103 may connect to a USB hub 407. In further embodiments, the USB hub 407 may be connected to a network device 403, a keypad 505, a mouse 504, other USB devices 503, and a USB connection to a display 502. The USB connection to a display 502 may join a monitor 501 to the SPS 103 via the USB hub 407.

Figure 6:
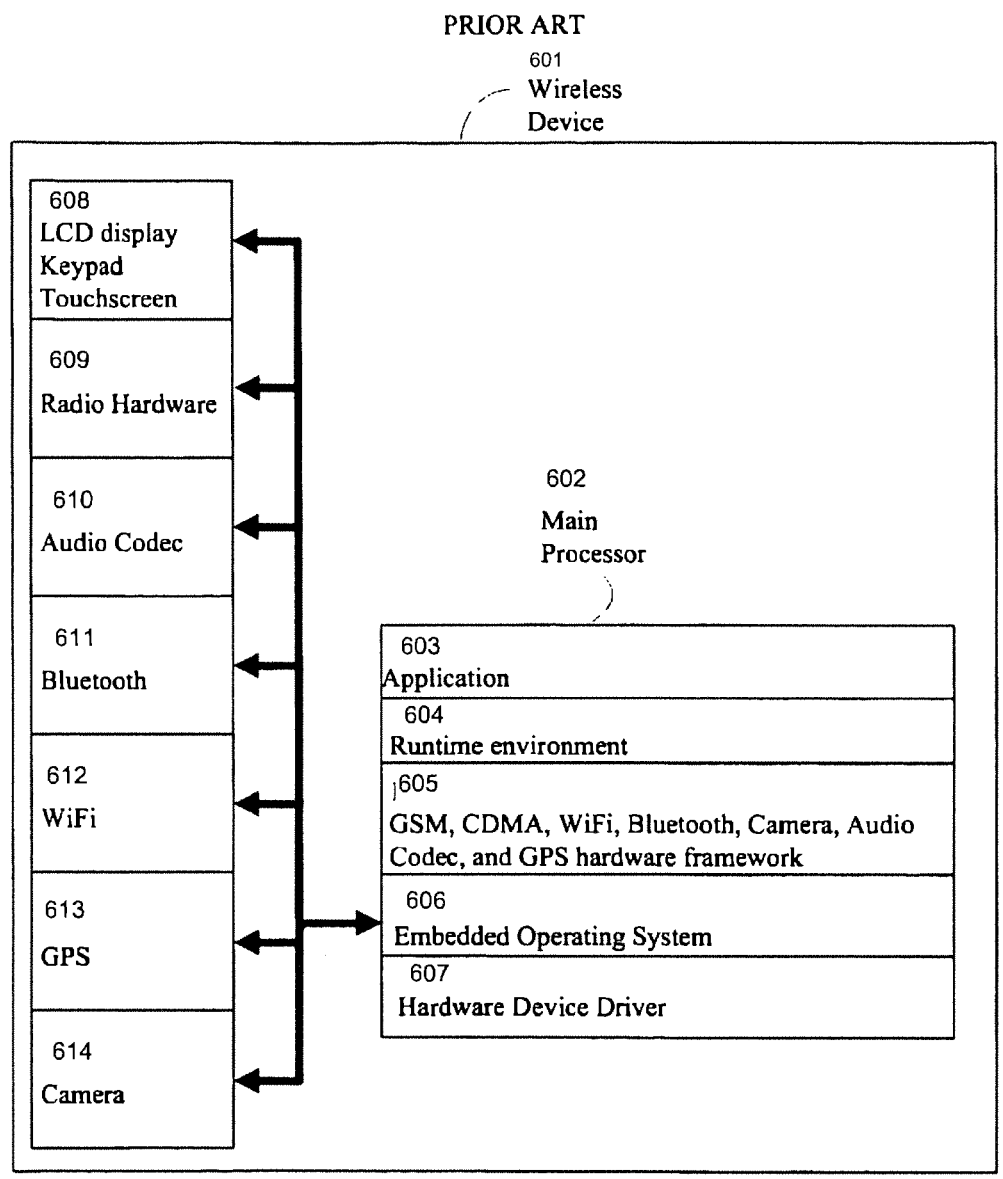
FIG. 6 illustrates a typical architecture for a wireless device with a processor co-located with the interface hardware.

FIG. 6 illustrates a typical architecture for a wireless device with a processor co-located with the interface hardware. As shown in FIG. 6, typical architecture for a wireless device includes a processor 602 located with the rest of the interface hardware in the wireless device 601. The wireless device hardware may include one or more peripheral devices, including an LCD display, keypad, or touch screen 608; radio hardware 609 (GSM, CDMA, TD-SCDMA, etc.); an audio codec 610; Bluetooth 611; WiFi 612; GPS 613; and a camera 614, each connected to the main processor 602 through a hardware device driver 607. Additionally, the wireless device 601 may include a software application 603, a runtime environment 604, hardware framework 605, and an embedded operating system kernel 606.

Client-Server Architecture and Design

Figure 7:
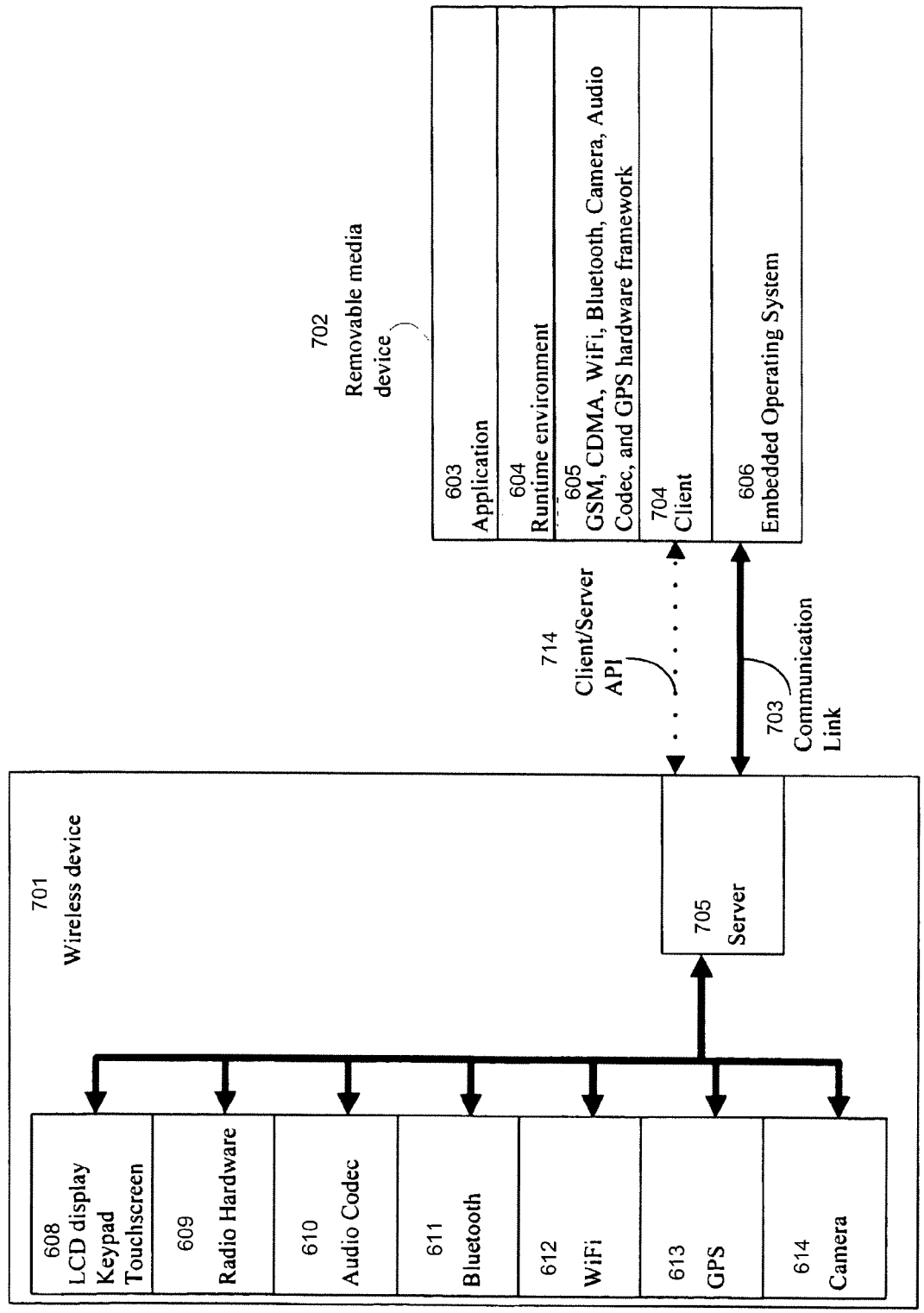
FIG. 7 illustrates a block diagram of an embodiment of the present invention showing a server in a wireless device and a client in a removable media device.

The remaining Figures may be used to illustrate embodiments of the present invention. As shown in FIG. 7, one embodiment of the present invention may include a wireless device 701 having a server 705 controlling peripheral device hardware 608-614, and a removable media device 702 that may include a client 704 containing the application 603, runtime environment 604, and embedded operating system 606. The server 705 of the removable media device 702 may be connected to and communicate with the client 704 of the wireless device 701 via a communication link 703.

According to one aspect of the present invention, application 603 in the removable media device 702 may request a hardware resource through the hardware framework 605. In response, the client 704 may request that this resource be allocated to the server 705 on the wireless device 701. The server 705 may then virtually map the device hardware 608-614 on the wireless device 201 for the particular resource to the processor that is located in the removable media device 202.

By using the client/server architecture, the present invention may provide compatibility and increase the portability of a software application from one wireless device to another. The wireless device 701 does not require a sophisticated processor or complex software. Rather, the wireless device 701 may simply include drivers to manage its resources and communicate with the client 704 in the removable media device 702.

In one embodiment shown in FIG. 7, the server 705 and the client 704 may communicate with each other via a client-server application program interface ("API") 714. The API 714 at the server 705 may map the device resources to the applications 603 via the client 704. Whenever the client application 603 requests device resources, the application request is made via the API 714 to the server 705. This eliminates the dependency of the wireless device features and the wireless applications, and with the removable media, brings the additional benefits of application portability and security.

In one aspect, the hardware framework 605 of the removable media device 702 may be a library or collection of functions for a particular one or more of the hardware devices 607-613. Hardware device drivers may also be present on the removable media device 702. This aspect, however, is not necessary. The hardware framework 605 on the removable media device 702 may simply be associated with the client 704. That is, the actual drivers used to implement the hardware devices may be located in the wireless device 701. This configuration is discussed in greater detail below with reference to FIG. 10, which shows a wireless device 701 having hardware device drivers 1013-1015.

In one aspect, the client 704 of the removable media device in FIG. 7 may be a stub application. A stub may be a small software application. The server 705 of the wireless device 701 may also be a stub application. In another aspect, the communication link 703 may be a simple or high-speed bus, such as a USB. The communication link 703 may also be a wireless connection. Further aspects include but are not limited to USB, SD, micro SD, SIM, SAM, or MMC as a communication link 703.

An OpenMoko Neo Free Runner handset may be used for the wireless device 701, though any hardware configuration is possible. In other aspects, a Samsung S3C2443 development board may be used as the removable media device 702. Linux may be chosen as an open source operating system for the embedded operating system 606 in one embodiment of the present invention. Other operating systems available may include but are not limited or restricted to Win CE, Symbian, or any other embedded operating system. Another aspect may include incorporation of a graphic system (such as, for example, X-Window) that may run on embedded operating system kernel 606. Another aspect may include MatchBox as a runtime environment 604, but any runtime environment may be used, including Android, QT, MontaVista, and Openmoko.

Figure 8:
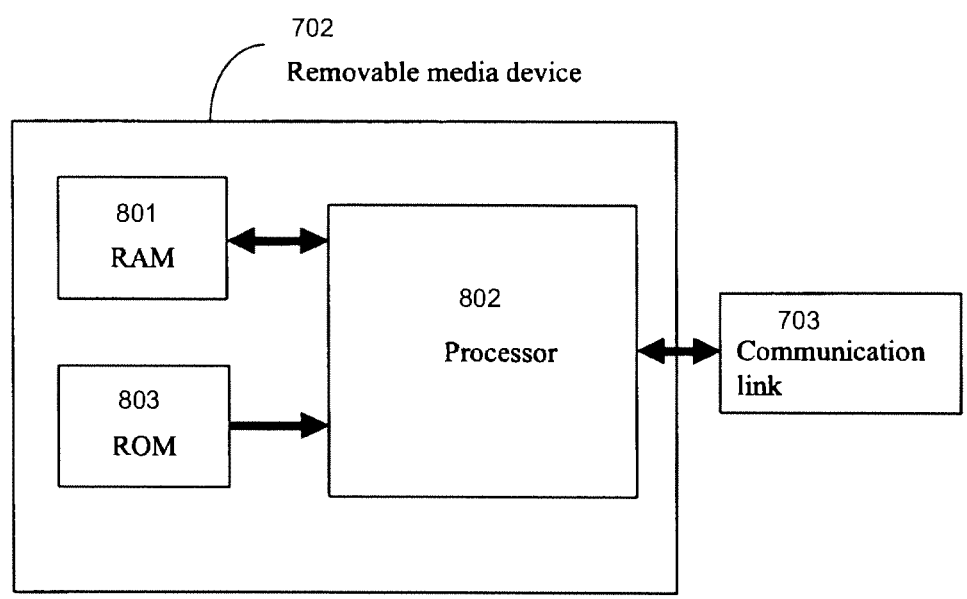
FIG. 8 illustrates a block diagram of the hardware design of the removable media device according to one embodiment of the present invention.

FIG. 8 illustrates a block diagram of the hardware design of the removable media device 702. As shown, removable media device 702 may include Random Access Memory ("RAM") 801, Read-Only Memory ("ROM") 803, and processor 802. Removable media device 702 may be connected to a wireless device (such as wireless device 701 in FIG. 7) via communication link 703. The removable media device 702 may have any form factor including but not limited to MMC, SD, micro SD, SIM, SAM, or USB dongle.

Exchanging Data and Information

Figure 9:
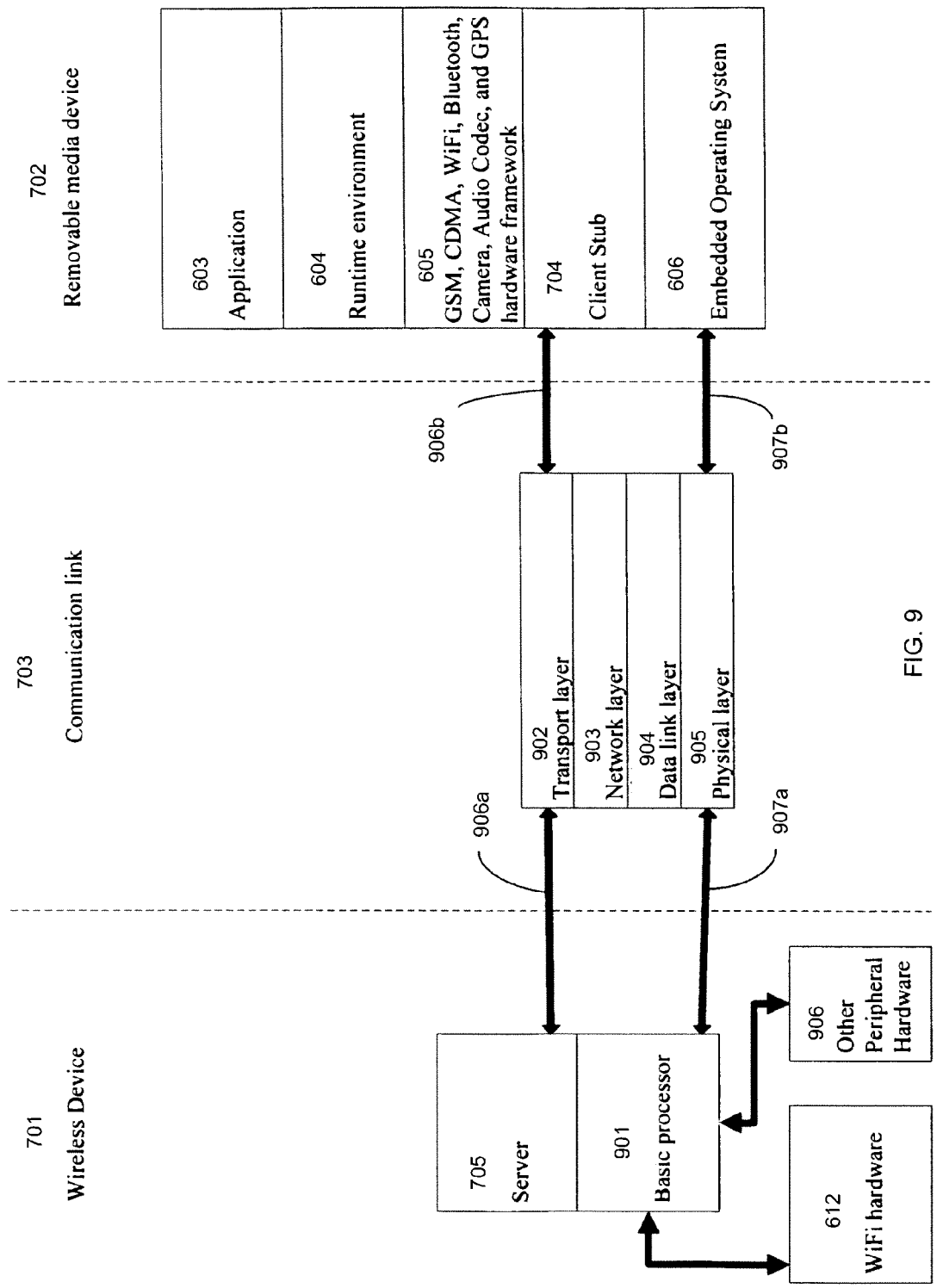
FIG. 9 illustrates a block diagram for the communication between the wireless device and a removable media device according to one embodiment of the present invention.

FIG. 9 shows the logical data exchange between the removable media device 702 and the wireless device 701 according to one embodiment of the present invention. The removable media device 702 and the wireless device 701 may communicate with one another using an Open Systems Interconnection Reference Model architecture, wherein the communication link 703 may include a transport layer 902, network layer 903, a data link layer 904, and a physical layer 905. For example, WiFi hardware 612 or hardware 906 associated with one or more other peripheral devices (e.g., LCD display, keypad or touch screen; radio hardware; an audio codec; Bluetooth; GPS; a camera; etc.) may be mapped to a client stub 704 in the removable media device 702 using a transport layer 902 of the communication link 703. In further aspects, interface 906b of the communication link 703 maps the client stub 704 to the transport layer 902, and interface 906a maps the transport layer 902 to the server 705. In another aspect, interface interface 907b maps the embedded operating system 606 to the physical layer 905, and interface 907a maps the physical layer 905 to a basic processor 901 of the wireless device 701.

In FIG. 9, the application process may start on the client side. The client application 603 may call a local client stub procedure instead of code implementing the procedure. Stubs may be compiled and linked with the client application 603 during development. Instead of containing code that implements the remote procedure, the client stub code may retrieve the required parameters from the calling application and wrap it as a TCP/IP packet and may deliver them to the communication link 703 that connects to the wireless device 701 containing the server 705.

On the wireless device 701, the server 705 may receive the parameters from the client, and the server 705 may call the server procedure. The server 705 may call the actual procedure on the server 705 with the parameters from the client. The remote procedure may then run, possibly generating output parameters and a return value. When the remote procedure is complete, a similar sequence of steps may return the data to the client stub 704. After the remote procedure returns its data to the server 705, the server may encapsulate output parameters to the format required for transmission back to the client. The server 705 may return the output parameter to the client stub 704 over the communication link 703. The client stub 704 may complete the process by accepting the data over the network and returning it to the calling function from application 603.

In further aspects, each hardware device (i.e., WiFi hardware 612 or other peripheral hardware 906) that is mapped may be assigned to a logical port through which it may communicate. The server 705 on the wireless device 701 may communicate the hardware configuration of a particular hardware device to the client stub 704 on the removable media device 702. The client stub 704 may assign a logical port to each hardware device reported by the server 705. The logical ports may start at 8889 and may decrement the port address for each next hardware device present on the wireless device 701. The client stub 704 may inform the server 705 of the hardware device logical port assignments.

In one aspect in particular, port 8889 may be assigned to map the WiFi hardware 612 from the wireless device 701 to the removable media device 702. When an application 603 or runtime environment 604 in the removable media device 702 requests a WiFi function, such as scanning for an access point, the client stub 704 sends this command via port 8889 to the server 705 in the wireless device 701. The server 705 may then instruct the WiFi hardware 612 to scan and return a list of access points found through the same logical port 8889. The client stub 704 may send the list of access points to the calling application 603 or runtime environment 604.

Accessing Peripheral Devices

Figure 10:
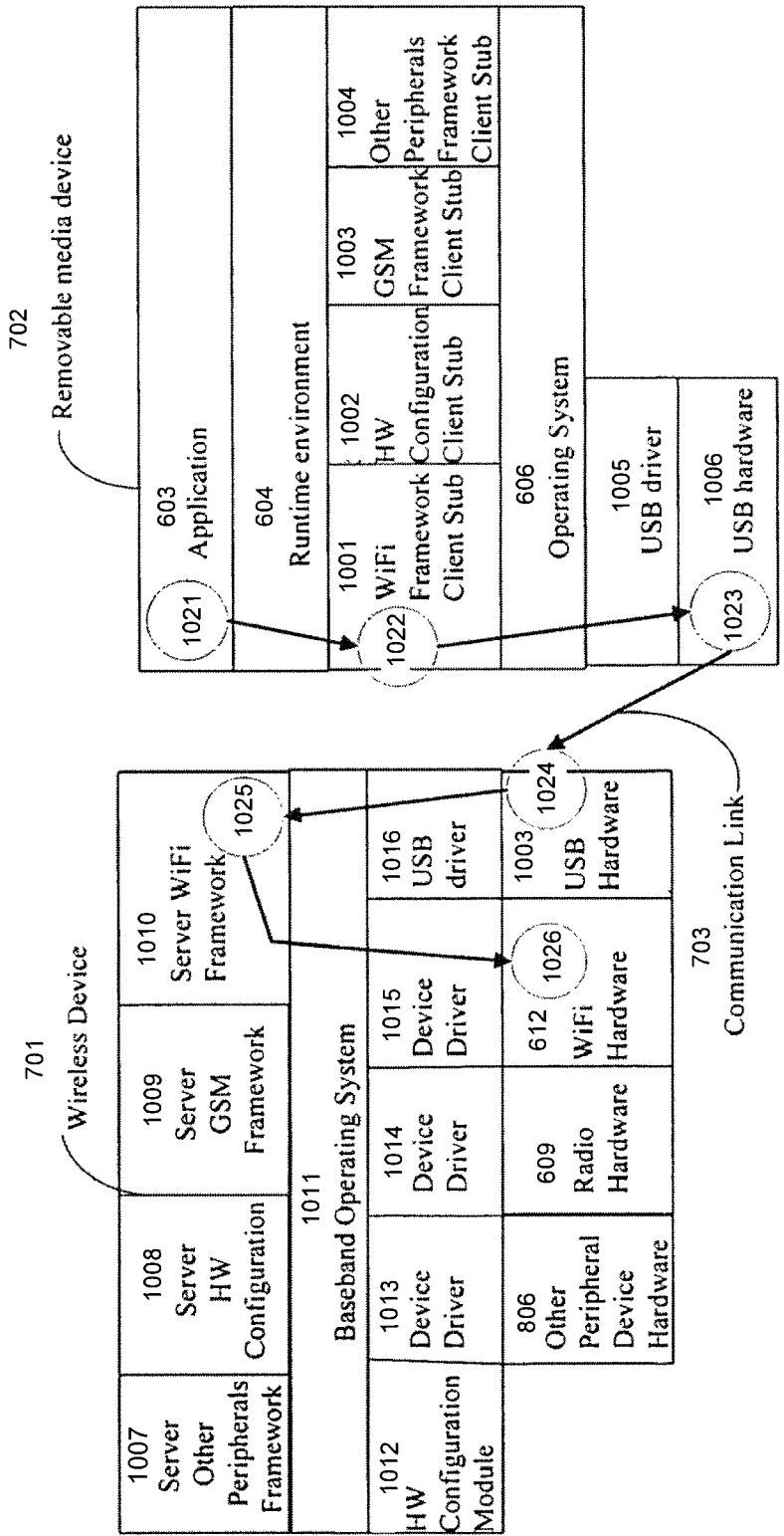
FIG. 10 illustrates a prototype implementation of the client and server according to one embodiment of the present invention.

FIG. 10 illustrates the flow of information from an application 603 that requests access to WiFi hardware 612 to scan for an access point. The information flow is depicted by the arrow in FIG. 10 in the sequence identified by the bubbles numbered 1021 through 1026. In this embodiment of the present invention, the wireless device 701 may include one or more hardware framework server stub applications 1007-1010 running on a baseband operating system 1011 and hardware devices 806, 609, 612 driven by device drivers 1013-1015. The wireless device 701 may also include a hardware configuration module 1012 for storing the configuration settings of the hardware devices 806, 609, and 612. The media device 702 may include one or more corresponding client stubs 1001-1004. The wireless device 701 and removable media device 702 may communicate with each other through communication link 703 via USB hardware 1003, 1006 driven by USB drivers 1016, 1005.

As shown in step 1021, an application 603 may first issue a scan command to the WiFi framework client stub 1001. In step 1022, instead of the client stub WiFi framework 1001 executing the procedures/codes to access the WiFi device hardware drivers—which may not be present on the removable media system—the client stub WiFi framework may encapsulate the parameters (command and data) into a TCP/IP packet and send it to the communication link 703 via the USB hardware 1006. The command and data may be stored as the payload in the TCP/IP packet sent over the communication link 703.

Step 1023 may involve the removable media device 702, which may be remotely connected to the wireless device 701 via USB CDC RNDIS/ethernet, functioning as though it is physically connected to the wireless device 701 and sending the TCP/IP packet to the wireless device 701 at a certain port number. This may be accomplished using a USB standard endpoint descriptor.

In step 1024, the wireless device 701 may receive the packet and send it to the server stub WiFi framework 1010 in the baseband processor of the wireless device. Each server hardware framework (e.g., 1007-1010) corresponding to a particular hardware device may have its own logical port on the TCP/IP network. The logical port may be dynamically assigned during start up. The servers 1007-1010 may inform the client stubs 1001-1004 of the hardware configuration present on the wireless device 701 and their corresponding logical port numbers. The ports may be assigned according to hardware type; for example, GSM may be 8889 and WiFi may be 8888.

The server 1010 for the WiFi framework on the wireless device 701 may listen to TCP/IP at port number 8888, as shown in step 1025. There may be a buffer for each logical port address on a transport layer (such as transport layer 902 shown in FIG. 9). The server 1010 may check the buffer of a logical port address to determine if there is any data present. Once the packet is received, it may remove the encapsulation from the packet. For a framework call, the server 1010 may implement the framework to call the WiFi hardware 612. A framework may be a library of functions that implement hardware functionality, for instance, having the WiFi hardware 612 scan for an access point.

Finally, in step 1026, the command may be received by the WiFi hardware 612 and executed. A result may be returned to the calling application 603 through the reverse order of information flow (i.e., from step 1026 to step 1025 . . . to step 1021). A wireless device 701 may operate with the removable media device 702 as long as the server stub of server 1010 may implement the parameters and API of the client stub 1001, even if, for example, the configuration of the WiFi hardware 612 is different than the corresponding hardware configuration for the removable media device 702.

The advantages of embodiments of the present invention may include one or more of the following: (1) because the wireless device does not require high processing power, and may include only the server API, there may be significant product development cost savings and/or decreased time to market; (2) wireless applications may be portable from one wireless device to any such device that contains the server API, allowing more freedom for the consumers; and (3) service providers can ensure full portability of the user interface when the consumers change wireless devices because the user interface of the new wireless device can be programmed in the removable media device.

Although illustrative embodiments have been shown and described herein in detail, it should be noted and will be appreciated by those skilled in the art that there may be numerous variations and other embodiments that may be equivalent to those explicitly shown and described. For example, the scope of the present invention is not necessarily limited in all cases to execution of the aforementioned steps in the order discussed. Unless otherwise specifically stated, terms and expressions have been used herein as terms of description, not of limitation. Accordingly, the invention is not to be limited by the specific illustrated and described embodiments (or the terms or expressions used to describe them) but only by the scope of claims.

What is claimed is:

1. A method for operating one or more peripheral devices of a wireless device from a media device having a client stub comprising:
   mapping peripheral device hardware on the wireless device to a client stub of the media device using a transport layer of a communication link;
   mapping, by a first media device communication link interface, said client stub of said media device to said transport layer;
   mapping, by a first wireless device communication link interface, said transport layer to a server of said wireless device;
   sending, by said client stub of said media device, wrapped TCP/IP packets containing hardware device parameters to said server of said wireless device via said communication link;
   receiving, on a processor of the wireless device, said wrapped TCP/IP packets containing hardware device parameters and client stub data sent from said media device;
   unwrapping, on said wireless device, said wrapped TCP/IP packets containing hardware device parameters; and
   sending said TCP/IP packets to a server stub framework in said processor of said wireless device.

2. A method as claimed in claim 1, further comprising the step of scanning for an access point connection, wherein said scanning step is performed by said peripheral device hardware.

3. A method as claimed in claim 1, further comprising the step of mapping, by a second media device communication link interface, an embedded operating system of said media device to a physical layer of said communication link.

4. A method as claimed in claim 3, further comprising the step of mapping, by a second wireless device communication link interface, said physical layer to a processor of said wireless device.

5. The method of claim 1, wherein said communication link adheres to a SIM, SAM, SD, micro SD, or USB dongle form factor.

6. A system for operating one or more peripheral devices of a wireless device from a media device having a client stub comprising:
   a wireless device having a processor;
   a media device having a client stub;
   a communication link coupled to said wireless device and said media device, wherein peripheral device hardware on said wireless device is configured to be mapped to a client stub of said media device using a transport layer of said communication link;

a first media device communication link interface, configured to map said client stub of said media device to said transport layer of said communication link; and a first wireless device communication link interface, configured to map said transport layer of said communication link to a server of said wireless device;

wherein said client stub of said media device is configured to send wrapped TCP/IP packets containing hardware device parameters to said server of said wireless device via said communication link; and wherein said processor of said wireless device is configured to:

receive said wrapped TCP/IP packets containing hardware device parameters and client stub data sent from said media device; and unwrap said wrapped TCP/IP packets containing hardware device parameters.

7. A system as claimed in claim 6, wherein said processor of said wireless device is further configured to send said TCP/IP packets to a server stub framework in said processor of said wireless device.

8. A system as claimed in claim 6, wherein said peripheral device hardware of said wireless device is configured to scan for an access point connection.

9. A system as claimed in claim 6, further comprising a second media device communication link interface, configured to map an embedded operating system of said media device to a physical layer of said communication link.

10. A system as claimed in claim 9, further comprising a second wireless device communication link interface, configured to map said physical layer to a processor of said wireless device.

11. The system of claim 6, wherein said communication link adheres to a SIM, SAM, SD, micro SD, or USB dongle form factor.

12. A system for operating one or more peripheral devices of a wireless device from a media device having a client stub comprising:

a communication link comprising one or more protocol layers;

a wireless device, comprising:
a first processor;
a first memory coupled to said processor;
one or more peripheral devices configured to run on said first processor and first memory; and
a first server configured to run on said first memory and said first processor, wherein said first server is adapted to communicate with at least one of said peripheral devices and the media device;
wherein said first server and said first processor are configured to unwrap hardware device parameters; and
wherein said first processor and said first memory are configured to communicate with said one or more peripheral devices;

said media device, comprising:
a second memory;
a second processor coupled to said second memory; and
a client stub configured to run on said second processor and second memory, wherein said client stub is configured to communicate with said first server of said wireless device, and said first server is configured to communicate with said client stub of said media device;
wherein said client stub is configured to emulate said one or more peripheral devices of the wireless device;
wherein a first media device communication link interface is configured to map said client stub of said media device to said transport layer; and
wherein a first wireless device communication link interface is configured to map said transport layer to a server of said wireless device.

13. A system as claimed in claim 12, wherein said peripheral device hardware of said wireless device is configured to scan for an access point connection.

14. A system as claimed in claim 12, further comprising a second media device communication link interface, configured to map an embedded operating system of said media device to a physical layer of said communication link.

15. A system as claimed in claim 14, further comprising a second wireless device communication link interface, configured to map said physical layer to a processor of said wireless device.

16. A system as claimed in claim 12, wherein said client stub of said media device is configured to send wrapped TCP/IP packets containing hardware device parameters to said server of said wireless device via said communication link.

17. A system as claimed in claim 16, wherein said processor of said wireless device is configured to:

receive said wrapped TCP/IP packets containing hardware device parameters and client stub data sent from said media device; and unwrap said wrapped TCP/IP packets containing hardware device parameters.

18. A system as claimed in claim 17, wherein said processor of said wireless device is further configured to send said TCP/IP packets to a server stub framework in said processor of said wireless device.

19. The system of claim 12, wherein said communication link adheres to a SIM, SAM, SD, micro SD, or USB dongle form factor.

* * * * *